(12) United States Patent
Liang et al.

(10) Patent No.: US 7,245,414 B2
(45) Date of Patent: Jul. 17, 2007

(54) ELECTROCHROMIC OR ELECTRODEPOSITION DISPLAY AND NOVEL PROCESS FOR THEIR MANUFACTURE

(75) Inventors: Rong-Chang Liang, Cupertino, CA (US); Jack Hou, Fremont, CA (US); Sundaravel P. Ananthavel, Alameda, CA (US)

(73) Assignee: SiPix Imaging, Inc., Fremont, CA (US)

( * ) Notice: Subject to any disclaimer, the term of this patent is extended or adjusted under 35 U.S.C. 154(b) by 595 days.

(21) Appl. No.: 10/660,381

(22) Filed: Sep. 10, 2003

(65) Prior Publication Data
US 2006/0139724 A1 Jun. 29, 2006

Related U.S. Application Data

(60) Provisional application No. 60/409,833, filed on Sep. 10, 2002.

(51) Int. Cl.
*G02F 1/15* (2006.01)

(52) U.S. Cl. .................. 359/265; 359/296
(58) Field of Classification Search ......... 359/290, 359/291, 295, 298, 245, 270, 265, 296, 297
See application file for complete search history.

(56) References Cited

U.S. PATENT DOCUMENTS

| | | | |
|---|---|---|---|
| 4,277,147 A * | 7/1981 | Arnoldussen | ......... 359/270 |
| 5,082,355 A | 1/1992 | Warszawski | |
| 5,764,401 A | 6/1998 | Udaka et al. | |
| 5,847,860 A | 12/1998 | Hougham et al. | |
| 5,864,420 A | 1/1999 | Udaka et al. | |
| 5,880,872 A | 3/1999 | Udaka | |
| 6,172,794 B1 | 1/2001 | Burdis | |
| 6,245,262 B1 | 6/2001 | Varaprasad et al. | |
| 6,301,038 B1 | 10/2001 | Fitzmaurice et al. | |
| 6,336,753 B1 | 1/2002 | Kihira et al. | |
| 6,351,328 B1 | 2/2002 | Byker | |
| 6,547,797 B1 | 4/2003 | Lee | |
| 6,927,892 B2 * | 8/2005 | Ho et al. | ......... 359/296 |
| 2002/0075556 A1 | 6/2002 | Liang et al. | |
| 2002/0131152 A1 | 9/2002 | Liang et al. | |
| 2002/0176963 A1 | 11/2002 | Wang et al. | |
| 2002/0182544 A1 | 12/2002 | Chan-Park et al. | |
| 2002/0188053 A1 | 12/2002 | Zang et al. | |
| 2003/0007238 A1 | 1/2003 | Liang et al. | |
| 2003/0043450 A1 | 3/2003 | Liang et al. | |
| 2003/0053190 A1 | 3/2003 | Liang et al. | |

(Continued)

FOREIGN PATENT DOCUMENTS

JP 59 219723 12/1984

(Continued)

OTHER PUBLICATIONS

U.S. Appl. No. 09/518,488, filed Mar. 2000, Liang et al.

(Continued)

*Primary Examiner*—Timothy Thompson
(74) *Attorney, Agent, or Firm*—Howrey LLP (57) ABSTRACT

The present invention is directed to an improved electrodeposition and an electrochromic display. The display cells formed from microcups are filled with an electrolyte fluid and are individually sealed with a polymeric sealing layer.

53 Claims, 10 Drawing Sheets

U.S. PATENT DOCUMENTS

| | | | |
|---|---|---|---|
| 2003/0096113 A1* | 5/2003 | Jacobson et al. | 428/379 |
| 2004/0045830 A1 | 3/2004 | Tseng et al. | |
| 2004/0085619 A1 | 5/2004 | Wu et al. | |
| 2006/0066933 A1* | 3/2006 | Jagt et al. | 359/265 |
| 2006/0177669 A1* | 8/2006 | Yamana et al. | 428/423.1 |
| 2006/0177796 A9* | 8/2006 | Heasly | 433/136 |

FOREIGN PATENT DOCUMENTS

| | | |
|---|---|---|
| JP | 06 202166 | 7/1994 |
| JP | 11-101994 | 4/1999 |
| WO | PCT/US03/28540 | 6/2004 |

OTHER PUBLICATIONS

U.S. Appl. No. 09/606,654, filed Jun. 2000, Liang et al.

Bach, U., et al., "Nanomaterials-Based Electrochromics for Paper-Quality Displays", 2002, in Adv. Mater., 14, pp. 845-848.

Cummins, et al., "Ultrafast Electrochromic Windows Based on Redox-Chromophore Modified Nanostructured Semiconducting and Conductin Films", 2000, in J. Phys. Chem. B, 104, pp. 11449-11459.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10 (In Chinese, English abstract attached, full translation available upon request).

Harvey, T.G., "Replication Techniques for Micro-Optics", 1997, SPIE Proc., vol. 3099, 76-82.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Lee, H., & Liang, R.C. (Jun. 2003) SiPix Microcup(R) Electronic Paper—An Introduction. *Advanced Display*, 3, 4-9 (in Chinese, English abstract attached, full translation available upon request).

Liang, R.C., Hou, J., Zang, H.M., Chung, J., & Tseng, S. (2003), Microcup(R) displays : Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C. (Feb. 2003) *Microcup(R) Electrophoretic and Liquid Crystal Displays by Roll-to-Roll Manufacturing Processes*, Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, 3. (in Japanese, with English translation).

Shinozaki, K., "Electrodeposition Device for Paper-Like Displays", 2002, SID 02 Digest, pp. 39-41.

Skotheim, T.A., Elsenbaumer, R.L., & Reynolds, J., <<Handbook of Conducting Polymers>>, 1998.

Takemoto, M., Ottenbrite, R.M. & Kamachi, M. editors, "Functional Monomers and Polymers", 1997.

Slafer, W.D., "Continuous Manufacturing of Thin Cover Sheet Optical Media", 1992, SPIE Proc. , vol. 1663, pp. 324-335.

Zang, H.M., & Liang, R.C. (2003) Microcup Electronic Paper by Roll-to-Roll Manufacturing Processes. *The Spectrum*, 16(2), 16-21.

* cited by examiner

ELECTROCHROMIC OR ELECTRODEPOSITION DISPLAY AND NOVEL PROCESS FOR THEIR MANUFACTURE

RELATED APPLICATIONS

This application claims the benefit of U.S. Provisional Application No. 60/409,833 filed Sep. 10, 2002, which is incorporated herein by reference in its entirety.

BACKGROUND OF THE INVENTION

1. Field of the Invention

This invention relates to an electrochromic display (ECD) and an electrodeposition display (EDD), each comprising a plurality of isolated cells filled with an electrolytic fluid disposed between two electrodes.

2. Description of Related Art

Electrochemical displays, including electrochromic displays and electrodeposition displays, have been known for years and are attractive for portable display applications such as PDAs and e-books because they are reflective and may be driven at very low voltages. Electrochromic displays are non-light emission type display devices, the operation of which is based on reflection light or transmission light as a light control device through an electrochemical reaction and they broadly fall into three types: solution-based, intercalation (such as those disclosed in U.S. Pat. Nos. 6,172,794 and 6,245,262) and nanostructure. In the solution based electrochromic device, an organic electrochromic compound, such as one of viologens, is dissolved in an electrolyte solution and the solution is filled into an electrochemical cell comprising at least one transparent electrode. The electrochromic compound reversibly changes between the color and colorless states at the electrodes based on an electron transfer (reduction or oxidation) mechanism. Some of the drawbacks of this type of device are slow response rate due to the slow diffusion of redox active species towards the electrodes and low resolution and unacceptable stability of the electrochromic species for long-term operation. The second category of electrochromic devices is based on color change upon intercalation of small ions into a thin metal oxide film coated on conducting glass substrates. The performance of this type of device depends on the rate of ion transport into and out of the metal oxide film, which causes the switching time to be in the order of tens of seconds even for relatively small areas. Other disadvantages of this type of electrochromic devices include fading of color due to a certain degree of irreversibility of the diffused ion species to the metal oxide layer. The third category of the electrochromic displays uses nanostructure-film electrodes modified with electrochromophores. This type of electrochromic display represents an improvement over the other two types in terms of contrast ratio, switching rate and bi-stability (as reported in Fitzmaurice et. al. in U.S. Pat. No. 6,301,038; Cummings et.al., in J. Phys. Chem. B, 104, 11449 (2000); and U. Bach et. al. in Adv. Mater., 14, 845 (2002)). However, all three types of electrochromic devices can only be manufactured by a batch-wise process and moreover their resolution and color addressability remain unsatisfactory for many applications.

Electrodeposition displays (EDD) based on deposition/dissolution of metal salts particularly silver salts have been disclosed in *SID 02 Digest*, pp. 39-41 and U.S. Pat. Nos. 5,764,401, 5,864,420, 5,880,872 and 6,336,753, all issued to Sony Corporation. A typical EDD comprises two electrodes and a gel electrolyte consisting of a polymer matrix, a silver salt and a plasticizer or solvent. A reflective material such as $TiO_2$ dispersion is typically used in the display cell to achieve high reflectance. By applying an appropriate voltage, the metal particles are deposited from the gel electrolyte onto a transparent electrode to show a colored state. Although the EDD described above addresses some of the drawbacks of the ECDs, such as the response time and contrast ratio, their usage is still limited due to certain problems. For example, no barrier or partition between pixels is present to confine the silver deposition within the addressed pixel. In addition, the silver metal tends to deposit all over the electrode which results in a poor image resolution. Although the image resolution may be improved by reducing the cell gap and optimizing the writing pulse width, color addressability of EDDs remains to be a major issue.

In view of the problems mentioned, improved ECDs and EDDs based on the microcup technology have been developed. Similar to the microcup based electrophoretic displays, the microcup based ECDs or EDDs of the present invention comprise a plurality of isolated cells (or microcups) filled with an electrolytic fluid disposed between two electrodes. The filled microcups may be sealed continuously with a sealing material by a one-pass or a two-pass process to achieve high resolution and color addressability. Other advantages of the microcup based ECDs and EDDs include superior physicomechanical properties such as impact and flexure resistance, compatibility with roll-to-roll manufacturing processes, format flexibility and low cost.

The microcup technology and related inventions are disclosed in co-pending applications, among them, Ser. No. 09/518,488, filed Mar. 3, 2000 (corresponding to WO01/67170), Ser. No. 10/087,527, filed Feb. 28, 2002, corresponding to US Publication No. 2002-0131152, Ser. No. 09/942,532, filed Aug. 29, 2001, corresponding to US Publication no. 2002-75556 (corresponding to WO 03/019280), Ser. No. 10/092,936, filed Mar. 6, 2002, corresponding to US Publication No. 2003-0053190, Ser. No. 10/179,997, filed Jun. 24, 2002, corresponding to US Publication No. 2003-0007238, Ser. No. 09/784,972, filed Feb. 15, 2001, corresponding to US Publication No. 2002-0182544 (corresponding to WO02/65215), Ser. No. 09/606,654, filed Jun. 28, 2000 (corresponding to WO02/01281), Ser. No. 09/874,391, filed Jun. 4, 2001, corresponding to US Publication No. 2002-0188053 (corresponding to WO 02/098977), Ser. No. 09/840,756, filed Apr. 23, 2001, corresponding to US Publication No. 2002-0176963 (corresponding to WO 02/086613), Ser. No. 10/229,530, filed Aug. 27, 2002, corresponding to US Publication No. 2003-0043450 (corresponding to WO 03/021346), Ser. No. 10/422,608, filed Apr. 23, 2003, Ser. No. 10/618,257, filed Jul. 10, 2003 and U.S. Pat. No. 6,545,797 the contents of all of which are incorporated herein by reference in their entirety.

SUMMARY OF THE INVENTION

The first aspect of the present invention is directed to an electrodeposition or electrochromic display comprising cells formed from microcups of well-defined shape, size and aspect ratio and sandwiched between a top electrode plate and a bottom electrode plate. The cells are filled with an electrolyte fluid and are individually sealed with a polymeric sealing layer.

The second aspect of the invention relates to the preparation of microcups involving embossing a thermoplastic or thermoset precursor layer coated on a conductor film with a pre-patterned male mold, followed by releasing the mold during or after the thermoplastic or thermoset precursor layer is hardened by radiation, cooling, solvent evaporation or other means.

The third aspect of the invention relates to formation of the microcups by imagewise exposure of a radiation curable layer coated on a conductor film, followed by removing the unexposed areas after the exposed areas have become hardened.

The fourth aspect of the invention relates to a microcup composition comprising an unsaturated moiety or additive as an absorbing material for gases such as chlorine, hydrogen and oxygen. The microcup composition may further comprise a catalyst for the hydrogenation or oxidation reaction. The use of a gas absorber in the microcup material improves the longevity of the display.

The fifth aspect of the invention relates to processes for sealing the filled microcups. The sealing composition comprises a thermoplastic, thermoset or a precursor thereof and may further comprise a gas absorbing material such as a chlorine, hydrogen or oxygen absorbing material. The sealing composition may also comprise a conductive additive or filler in the form of particles to facilitate the electron transfer reaction. In one of the preferred embodiments of the invention, the conductivity of the sealing layer is anisotropic and the vertical conductivity (conductivity in the electrode-electrolyte direction which is perpendicular to the conductor film surface) is much higher than the horizontal conductivity (the conductivity in the direction parallel to the conductor film).

In one of the preferred methods of sealing the filled microcups, the sealing is accomplished by dispersing the sealing composition in the electrolyte fluid before the filling step. The sealing composition is immiscible with the electrolyte fluid and has a specific gravity lower than that of the electrolyte fluid. After filling, the sealing composition phase separates from the electrolyte fluid and forms a supernatant layer at the top of the fluid. This is the one-pass process.

In another preferred method of sealing the filled microcups, the sealing can be accomplished by overcoating the electrolyte fluid with the sealing composition. This is the two-pass process.

In either one of the two preferred methods, the sealing of the microcups is conveniently accomplished by hardening the sealing layer by solvent evaporation, interfacial reaction, moisture, heat or radiation. UV radiation is the preferred method to harden the sealing layer, although a combination of two or more curing mechanisms as described above may be used to increase the throughput of sealing. Additives such as surfactant, leveling agent, filler, binder, viscosity modifier (thinning agent or thickener), co-solvent, antioxidant, dye or pigment may be added to the sealing composition to improve the display performance.

The sixth aspect of the invention relates to an optional adhesive layer between the top electrode plate and the sealed microcups. The adhesive layer may also comprise a conductive additive or filler in the form of particles or a gas absorbing material such as a chlorine, hydrogen or oxygen absorbing material. The conductivity of the adhesive layer is anisotropic and the vertical conductivity (conductivity in the direction perpendicular to the conductor film surface) preferably is much higher than the horizontal conductivity (the conductivity in the direction parallel to the conductor film).

The seventh aspect of the invention relates to an optional primer layer between the bottom of the sealed microcups and the bottom electrode plate. The primer layer may also comprise a conductive additive or a gas absorbing material.

The eighth aspect of the present invention relates to the use of density-matched reflecting particles in microcup ECD's and EDDs. The most preferred reflecting materials include $TiO_2$, ZnO, $BaSO_4$ and silica. They may be density-matched to the gel electrolyte by a polymer coating or microencapsulation method. The response rate of an ECD or EDD typically increases with decreasing viscosity of the electrolyte fluid. The use of density-matched reflecting particles eliminates the undesirable particle sedimentation even in an electrolyte fluid of low viscosity. As a result, the response rate of the display may be significantly improved without tradeoff in display longevity and image uniformity.

The electrodeposition or electrochromic display of the present invention has many advantages. One of them is that the microcup wall is in fact a built-in spacer to keep the top and bottom substrates apart at a fixed distance. The mechanical properties and structural integrity of this type of display are significantly better than any prior art displays including those manufactured by using spacer particles. Moreover, displays involving microcups have desirable mechanical properties including reliable display performance when the display is bent, rolled or under compression pressure from, for example, a touch screen application. The use of the microcup technology also eliminates the need of an edge seal adhesive to predefine the size of the display panel and confine the electrolyte fluid inside a predefined area. The electrolyte fluid within the display of U.S. Pat. No. 6,336,753 and the *SID* 02 *Digest,* pp. 39-41 publication prepared by the edge sealing adhesive method will leak out completely if the display is cut in any way, or if a hole is drilled through the display. The damaged display will be no longer functional. In contrast, the electrolyte fluid within the display prepared by the microcup technology is enclosed and isolated in each cell. The microcup display may be cut into any dimension without the risk of damaging the display performance due to the loss of electrolyte fluid in the active areas. Furthermore, the microcup structure enables a format flexible display manufacturing process wherein the process may be carried out roll-to-roll on a web continuously or semi-continuously.

The isolated microcup or cell structure is particularly important when cells are filled with electrolyte fluids of different specific properties such as switching rate, reflectivity, color and color density. Without the microcup structure, it will be very difficult to prevent the fluids in adjacent areas from intermixing or being subject to cross talk during operation. As a result, the bistable reflective display of this invention also has excellent color addressability and switching performance. In addition, the electrodeposition and electrochromic displays according to the present invention could be very thin, flexible and durable and may be manufactured at very low cost by a roll-to-roll and format flexible process.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with an electrolyte fluid.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of displays. In this application, it refers to the depth to width or depth to length ratio of the microcups.

II Preparation of the Microcups

II (a) Preparation of the Microcups by Embossing

Figure 1:
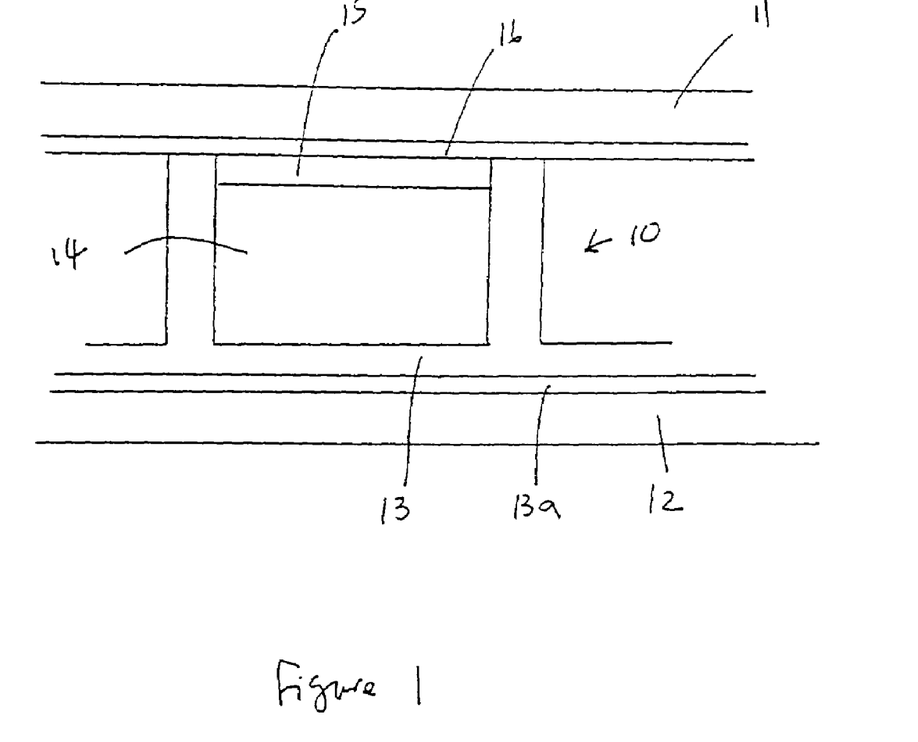
FIG. 1 depicts a typical electrodeposition display cell prepared from microembossing.

FIG. 1 illustrates a typical electrodeposition display cell prepared from microembossing. The cell (10) is sandwiched between two electrode plates (11, 12), at least one of which is transparent (11). The cell has a cell bottom (13). The cell is filled with an electrolyte fluid (14) and individually sealed with a polymeric sealing layer (15). The second electrode plate (11) is laminated over the sealed cell optionally with an adhesive layer (16).

Figure 2A:
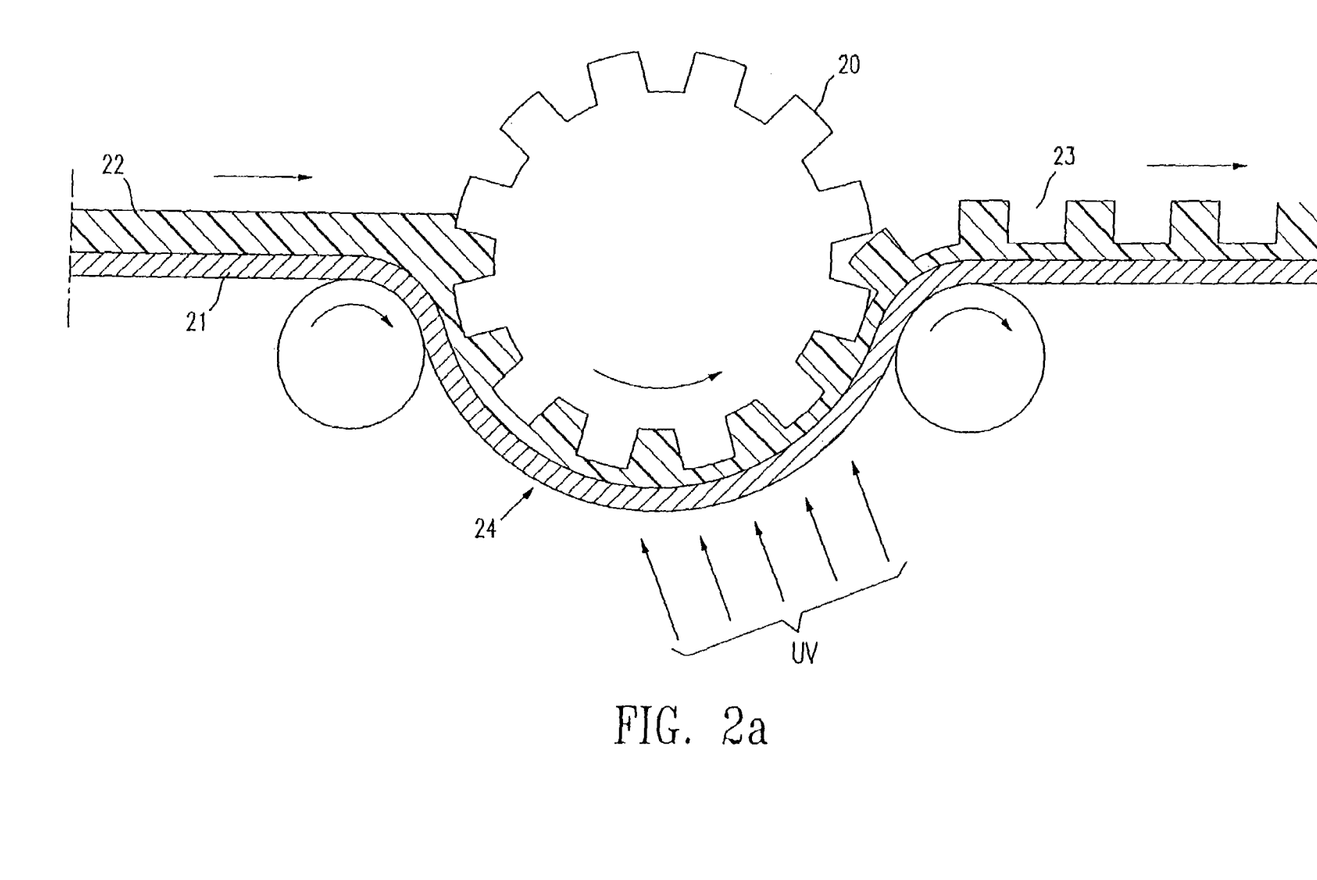
FIGS. 2a and 2b show the roll-to-roll process for the manufacture of an electrodeposition display, in particular, the creation of microcups by embossing a UV curable composition coated on a conductor film.
Figure 2B:
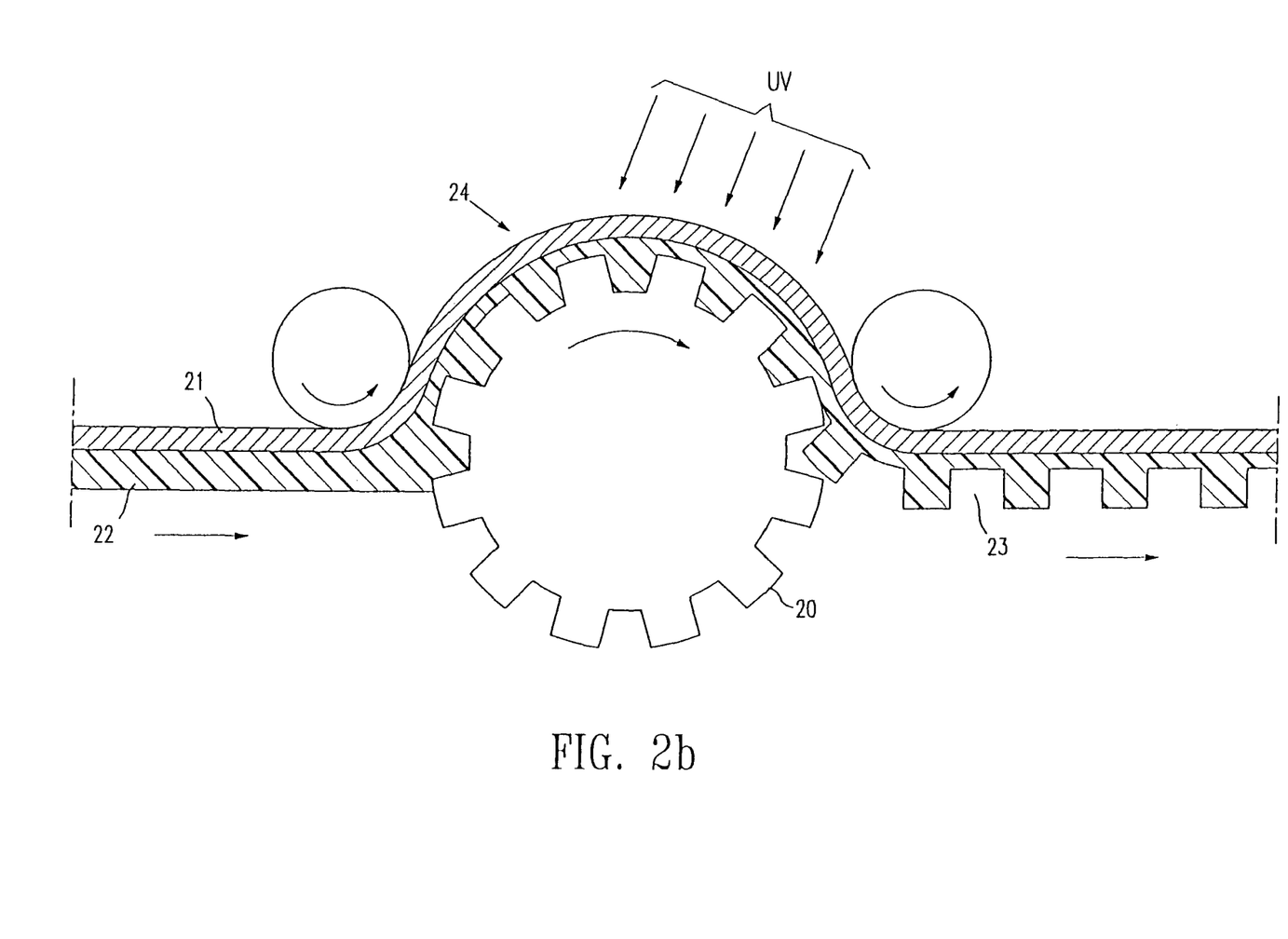

The microembossing processing step is shown in FIGS. 2a and 2b. A male mold (20) may be placed either above (FIG. 2a) or below (FIG. 2b) the web (24). A transparent conductive substrate is constructed by forming a transparent conductor film (21) on a glass plate or a plastic substrate. A composition comprising a thermoplastic, thermoset or a precursor thereof (22) is then coated on the conductor film. The thermoplastic or thermoset precursor layer is embossed at a temperature higher than the glass transition temperature (Tg) of the thermoplastic or thermoset precursor layer by the male mold in the form of a roller, plate or belt.

The thermoplastic or thermoset precursor for the preparation of the microcups may be selected from a group consisting of multifunctional acrylates or methacrylates, vinylethers, epoxides, oligomers or polymers thereof, and the like. Multifunctional acrylates and their oligomers are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate may also be added to improve the flexure resistance of the embossed microcups. The composition may contain oligomer, monomer, additives and optionally also a polymer. The glass transition temperatures for this class of materials usually range from about $-70°$ C. to about $150°$ C., preferably from about $-20°$ C. to about $50°$ C. The microembossing process is typically carried out at a temperature higher than the Tg. A heated male mold or a heated housing substrate against which the mold presses may be used to control the microembossing temperature and pressure. In the context of the present invention, the embossing conditions (such as embossing temperature, pressure and precursor viscosity) have to be optimized so that the cell bottom (13 in FIG. 1) of the microcup is thin enough to facilitate the electron transfer reaction at the interface between the electrode plate (12) and the electrolyte fluid (14). The thickness of the cell bottom (13) of the microcup is preferably less than 2 μm, more preferably less than 1 μm.

An optional primer layer (13a) may be used to pre-treat the conductor film to improve the adhesion between the microcup material and the conductor film and also to facilitate the mold release. A conductive filler or additive such as particles or fibers of a conductive polymer may be added to the primer layer to promote the electron transfer reaction. Examples of conductive polymers include polyacetylene, poly(p-phenylene), poly(p-phenylene vinylene), poly(phenylene sulfide), polypyrrole, polythiophene, polyaniline and doped derivatives thereof; carbon black; graphite; metal oxides such as ITO (indium-tin oxide), ATO (antimony-tin oxide) or ZTO (zinc-tin-oxide) and metals such as Au, Ag, Cu, Fe, Cr, Al, Mg, Zn or Ni. Transparent conductive particles such as ATO particles and conductive polymer particles are particularly preferred. A more extensive list of electrical conducting polymers can be found in, for example, "Functional Monomers and Polymers" edited by M. Takemoto, R. M. Ottenbrite, and M. Kamachi (1997); and "Handbook of Conducting Polymers", edited by T. A. Skotheim, R. L. Elsenbaumer, and J. Reynolds, (1998).

The optional primer layer may also comprise a gas absorbing material. Suitable gas absorbers (in particular for chlorine, hydrogen or oxygen) include rubbers such as polybutadiene, nitrile rubbers, styrene-butadiene copolymers; norbornene such as 5-ethylidene-2-norbornene and the like. The primer layer composition may further comprise a catalyst for the hydrogenation or oxidation reaction. Suitable catalysts include complexes of Co or V, such as Co acetoacetate, Co acetylacetonate, V acetoacetate or V acetylacetonate.

As shown in FIGS. 2a and 2b, the mold is released during or after the precursor layer is hardened to reveal an array of microcups (23). The hardening of the precursor layer may be accomplished by cooling, solvent evaporation, crosslinking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

The electron transfer reaction may be further improved by an oxidative or staining treatment of the surface of the microcups with $OsO_4$, $KM_nO_4$ or $K_2Cr_2O_7$. The oxidative treatment renders the bottom of the microcup more conductive and results in better display performance.

An unsaturated moiety or additive as a gas absorbing material as described above for the primer layer may be incorporated into the microcup composition. The use of a gas absorber in the microcup material improves the longevity of the display.

Preparation of the Male Mold

Figure 3A:
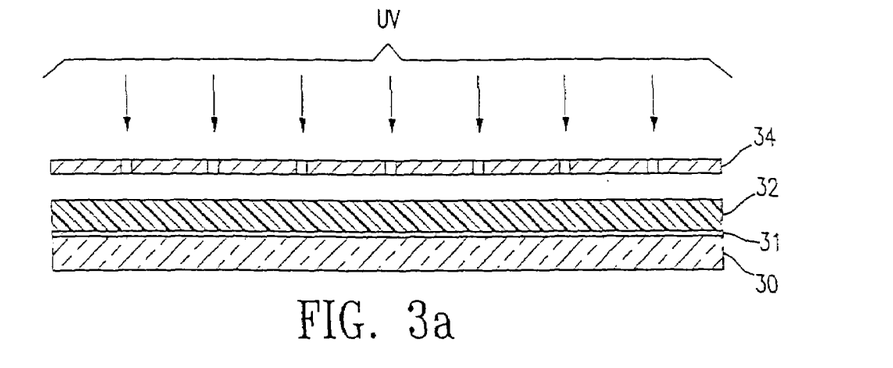
FIGS. 3a-3d illustrate a typical method of preparing a male mold for microembossing.
Figure 3B:
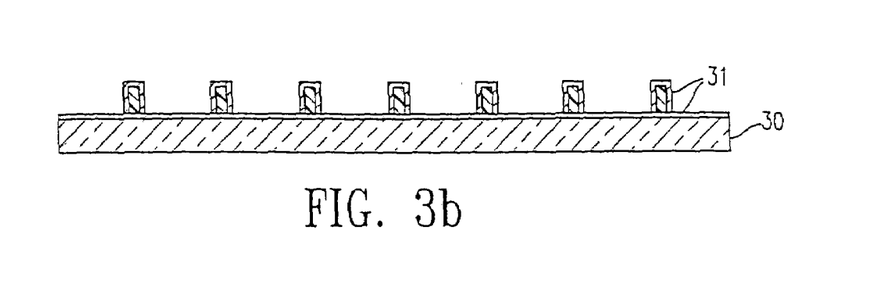
Figure 3C:
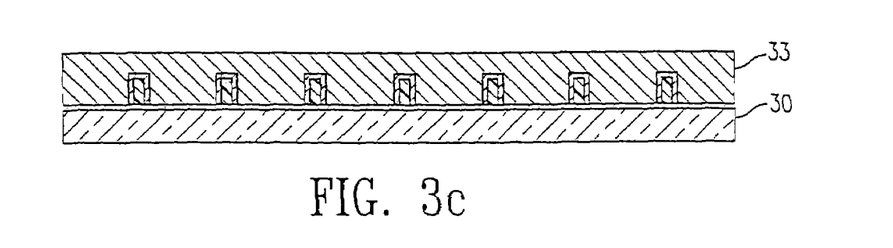
Figure 3D:
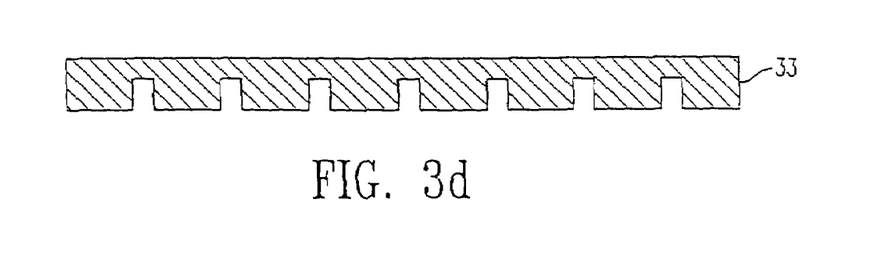

The male mold may be prepared by a diamond turn process or by a photoresist process followed by either etching or electroforming. A representative example for the preparation of the male mold is given in FIG. 3. With electroplating (FIG. 3a), a glass base (30) is sputtered with a thin layer (typically about 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing them with an appropriate solvent. The remaining hardened photoresist is dried and sputtered again with a thin layer of seed metal. The master (FIG. 3b) is then ready for electroforming. A typical material used for electroforming is nickel cobalt (33). Alternatively, the master can be made of nickel by nickel sulfamate electroforming or electroless nickel deposition as described in "Continuous manufacturing of thin cover sheet optical media", SPIE Proc. Vol. 1663, pp. 324 (1992). The floor of the mold (FIG. 3d) is typically between 50 to 400 microns thick. The master can also be made using other microengineering techniques including e-beam writing, dry etching, chemical etching, laser writing or laser interference as described in "Replication techniques for micro-optics", SPIE Proc. Vol. 3099, pp 76-82 (1997). Alternatively, the mold can be made by photomachining using plastics, ceramics or metals.

II (b) Preparation of the Microcups by Imagewise Exposure

Alternatively, the microcups may be prepared by imagewise exposure (FIG. 4a) of a radiation curable material (41) coated on the conductor film (42) to UV or other forms of radiation through a mask (40). The conductor film (42) is on a plastic substrate (43).

For a roll-to-roll process, the photomask may be synchronized with the web and move at the same speed as the latter. In the photomask (40) in FIG. 4a, the dark squares (44) represent the opaque area and the space (45) between the dark squares represents the opening area. The UV radiates through the opening area (45) onto the radiation curable material. The exposed areas become hardened and the unexposed areas (protected by the opaque area in the mask) are then removed by an appropriate solvent or developer to form the microcups (46). The solvent or developer is selected from those commonly used for dissolving or reducing the viscosity of radiation curable materials such as methylethylketone, toluene, acetone, isopropanol or the like.

Figure 4A:
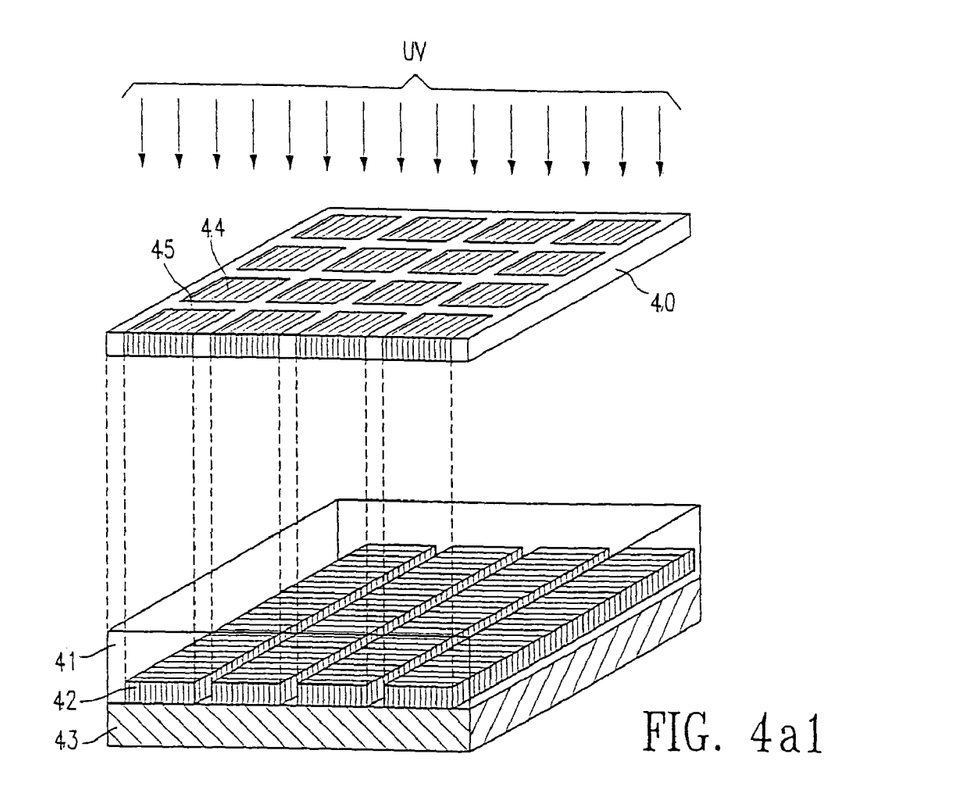
FIGS. 4a-4c show alternative processing steps for preparing the microcups involving imagewise exposure to UV radiation of a thermoset precursor coated on a conductor film.
Figure 4A:
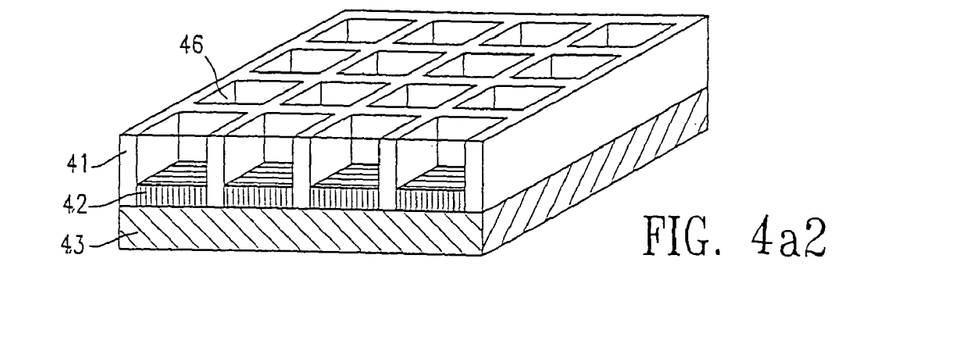
Figure 4B:
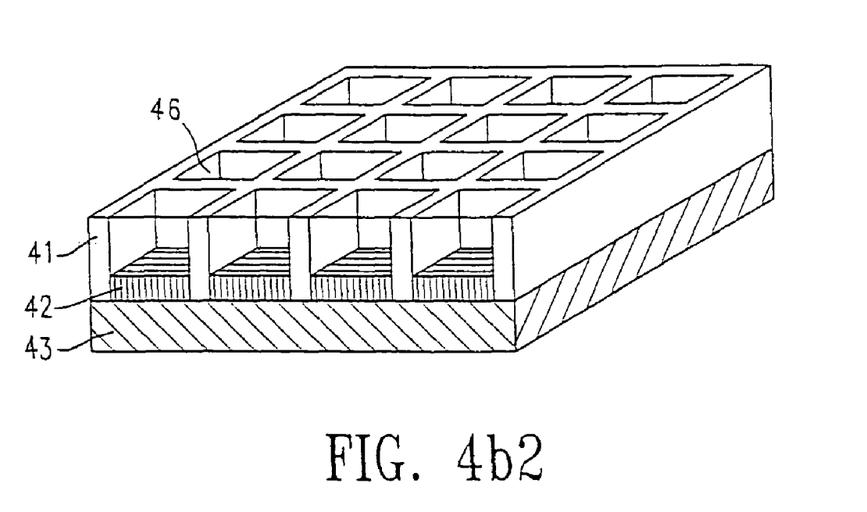
Figure 4B:
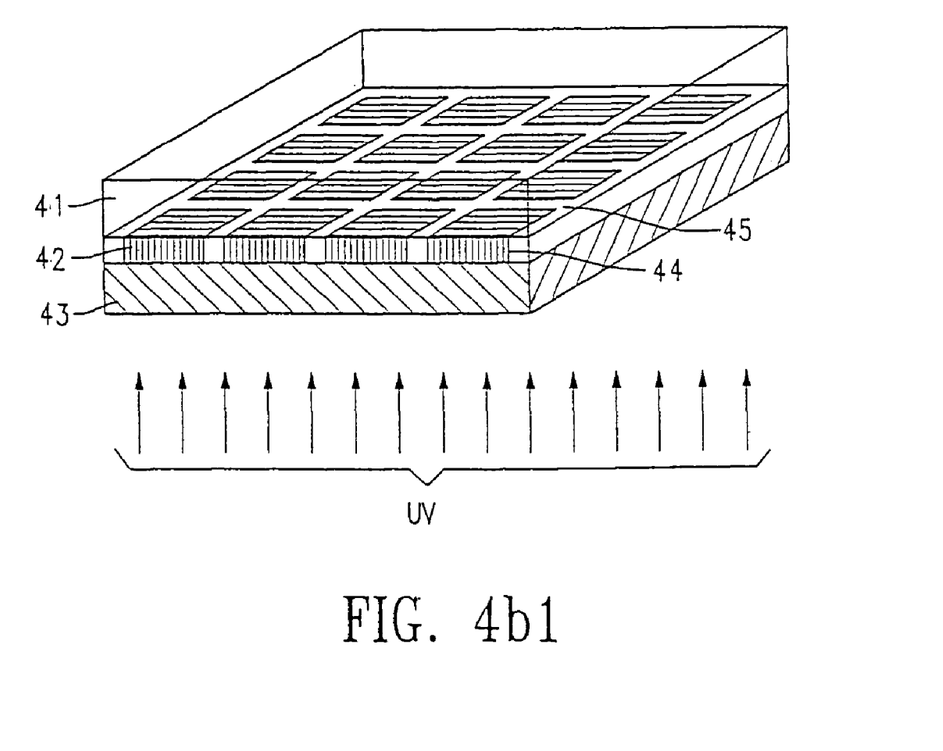
Figure 4C:
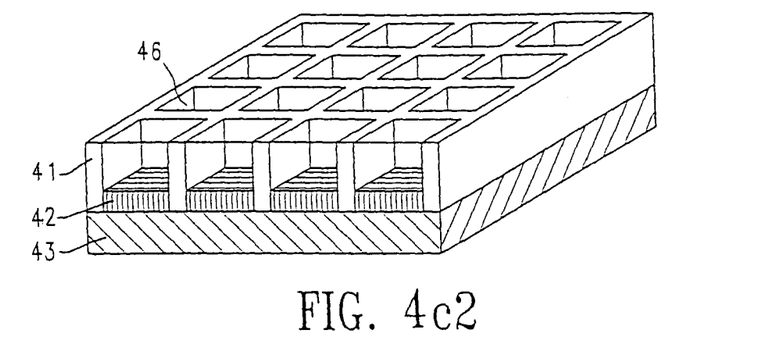
Figure 4C:
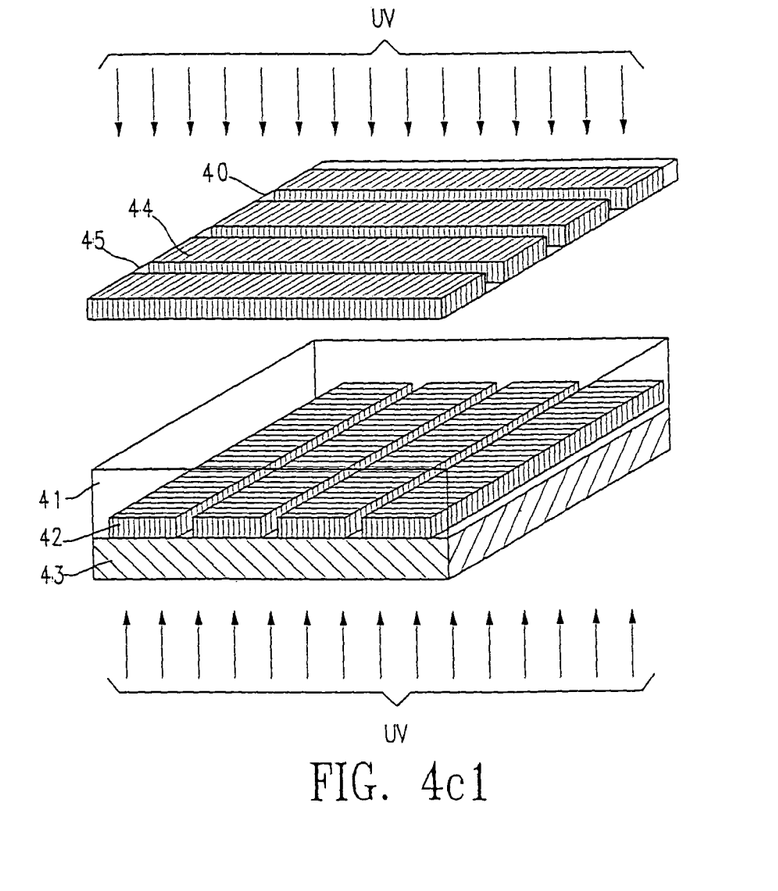

FIGS. 4b and 4c illustrate two other options for the preparation of microcups by imagewise exposure. The features in these two figures are essentially the same as shown in FIG. 4a and the corresponding parts are also numbered the same. In FIG. 4b, the conductor film (42) used is opaque and pre-patterned. In this case, it may be advantageous to imagewise expose the radiation sensitive material through the conductor pattern, which serves as the photomask. The microcups (46) can then be formed by removing the unexposed areas after UV radiation. In FIG. 4c, the conductor film (42) is also opaque and line-patterned. The radiation curable material is exposed from the bottom through the conductor line pattern (42), which serves as the first photomask. A second exposure is performed from the other side through the second photomask (40) having a line pattern perpendicular to the conductor lines. The unexposed area is then removed by a solvent or developer to reveal the microcups (46).

Figure 5:
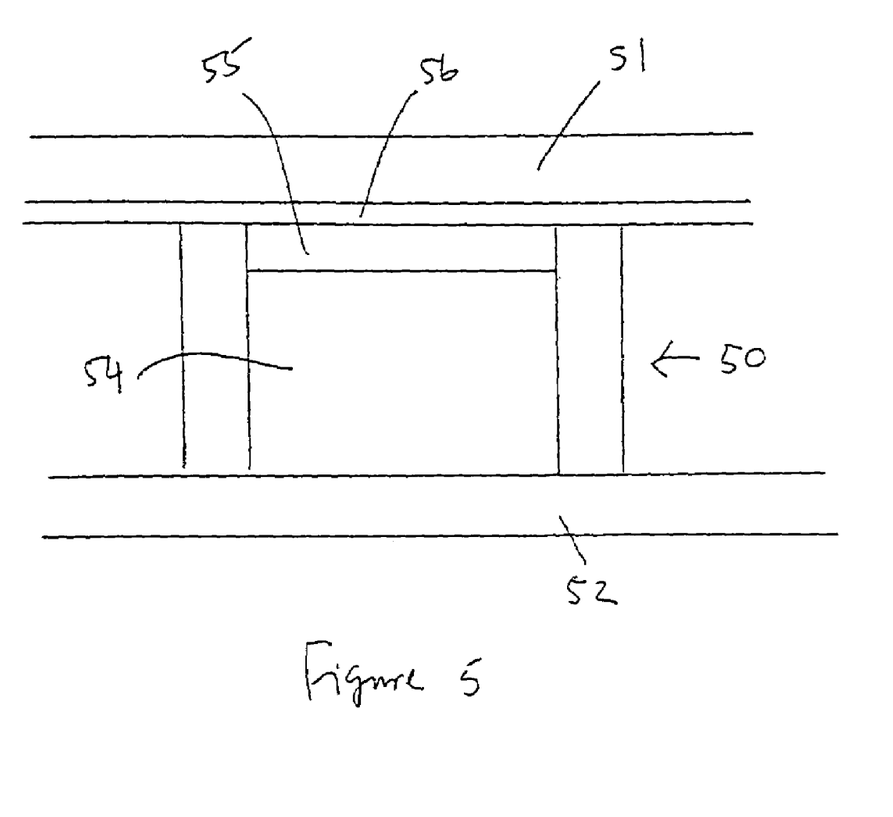
FIG. 5 illustrates a typical electrodeposition display cell prepared from imagewise exposure.

FIG. 5 depicts a typical electrodeposition or electrochromic display cell (50) prepared from imagewise exposure. It is substantially the same as the cell (in FIG. 1) prepared from microembossing except that there is no cell bottom in the microcup prepared from imagewise exposure as that part is removed along with the rest of unexposed area. As a result, the electrolyte fluid (54) in the cell prepared from the imagewise exposure is in direct contact with the electrode plate (52). The cell in FIG. 5 is sealed with a polymeric sealing layer (55) and the top electrode plate (51) is laminated over the sealed cell optionally with an adhesive (56).

In general, the microcups prepared from either method can be of any shape, and their sizes and shapes may vary. The microcups may be of substantially uniform size and shape in one system. However, in order to maximize the optical effect, microcups having a mixture of different shapes and sizes may be produced.

The openings of the microcups may be round, square, rectangular, hexagonal or any other shape. The partition area between the openings is preferably kept small in order to achieve a high color saturation and contrast while maintaining desirable mechanical properties. Consequently the honeycomb-shaped opening is preferred over, for example, the circular opening.

The dimension of each individual microcup may be in the range of about $10^2$ to about $1\times10^6$ $\mu m^2$, preferably from about $10^3$ to about $10^5$ $\mu m^2$. The depth of the microcups is in the range of about 3 to about 250 microns, preferably from about 10 to about 100 microns. The ratio between the areas of opening to the total area is in the range of from about 0.05 to about 0.95, preferably from about 0.4 to about 0.9. The width of the openings usually is in the range of from about 15 to about 450 microns, preferably from about 25 to about 300 microns, from edge to edge of the openings.

III. Sealing of the Microcups

The microcups prepared from one of the methods described above are then filled with an electrolyte fluid (discussed below) and sealed. The sealing of the filled microcups may be accomplished in a number of ways. A preferred approach is to disperse into an electrolyte fluid a sealing composition which comprises a material selected from the group consisting of polyvalent acrylates or methacrylates, cyanoacrylates, polyvalent vinyls including vinylbenzene, vinylsilane, vinylether, polyvalent epoxides, polyvalent isocyanates, polyvalent allyls, oligomers or polymers containing crosslinkable functional groups, and the like.

The sealing composition may optionally contain additives such as a polymeric binder or thickener, gas absorber, photoinitiator, catalyst, filler, colorant or surfactant. The sealing composition and the electrolyte fluid are thoroughly blended by, for example, an in-line mixer and immediately coated onto the microcups with a precision coating mechanism such as Myrad bar, gravure, doctor blade, slot coating or slit coating. If desired, excess fluid is scraped away by a wiper blade or a similar device. A small amount of a solvent or solvent mixture such as cyclohexanone, isopropyl acetate, ethyl acetate, methyl ethyl ketone, isopropyl alcohol, methanol or an aqueous solution thereof may be used to clean the residual electrolyte fluid on the top surface of the partition walls of the microcups. The sealing composition is immiscible with the electrolyte fluid and has a specific gravity lower than that of the solvent and the metal salt in the electrolyte fluid. Volatile organic solvents may be used to control the viscosity and coverage of the electrolyte fluid. The filled microcups are then dried and the sealing composition floats to the top of the electrolyte fluid. The microcups may be sealed by hardening the supernatant sealing layer by, for example, UV, during its separation or after it floats to the top. Other forms of radiation such as visible light, IR and electron beam may be used to cure and seal the microcups. Alternatively, heat or moisture may also be employed to dry, harden and seal the microcups, if a heat or moisture curable composition is used.

Surfactants may be used to improve the adhesion and wetting at the interface between the electrolyte fluid and the sealing material. Useful surfactants include the FC™ surfactants from 3M Company, Zonyl™ fluorosurfactants from DuPont, fluoroacrylates, fluoromethacrylates, fluoro-substituted long chain alcohols, perfluoro-substituted long chain carboxylic acids and their derivatives.

Alternatively, the electrolyte fluid and the sealing composition may be coated sequentially into the microcups, if the sealing precursor is at least partially compatible with the electrolyte fluid. Thus, the sealing of the microcups may be accomplished by overcoating a thin layer of the sealing composition as described above onto the filled microcups. This two-pass sealing process is particularly useful for electrolyte fluids of high viscosity.

The sealing composition may be cured as described above. Interfacial polymerization followed by UV curing is very beneficial to the sealing process. Intermixing between the electrolyte layer and the overcoat is significantly suppressed by the formation of a thin barrier layer at the interface by interfacial polymerization. The sealing is then completed by a post-curing step, preferably by UV radiation. To further reduce the degree of intermixing, it is highly desirable that the specific gravity of the overcoating is significantly lower than that of the electrolyte fluid. Volatile organic solvents may be used to adjust the viscosity and the thickness of the coatings. When a volatile solvent is used in the overcoat, it is preferred that it is immiscible with the solvent of the electrolyte fluid. The two-pass overcoating process is particularly useful when the electrolyte fluid is at least partially compatible with the sealing composition. Additives or fillers such as surfactant, antioxidant, crosslinker, thickener or polymer binder may also be used to improve the performance or processability. Preferred polymers for the sealing layer include thermoplastic elastomers such as Kraton polymers from Shell, diene rubbers such as polybutadiene, polychloroprene, polyisoprene, poly(styrene-co-butadiene), polyurethane and block copolymers thereof. The polymer may be in a solution or dispersion form. Preferred solvents for the sealing layer include methyl ethyl ketone (MEK), methyl propyl ketone, ethyl acetate, isopropyl acetate, butyl acetate, toluene, xylene, alkanes such as Isopar solvents, cyclohexane, heptane, octane, nonane, decane, decalin, dodecane or dodecylbenzene. Pigments, dyes or fillers such as silica, $CaCO_3$, $BaSO_4$, $TiO_2$, metal particles and their oxides, carbon black or conducting polymers may also be incorporated in the sealing layer particularly when the display is viewed from the opposite side.

The polymeric sealing layer formed encloses the electrolytic fluid within each cell and sealingly adheres to the surface of the partition walls. The electrolytic fluid may be partially filled in each microcup/cell. The sealing layer is in contact with the top surface of the electrolytic fluid.

As in the microcup composition, an unsaturated moiety or additive as a gas absorbing material may be incorporated into the sealing composition. Suitable gas absorbers include rubbers such as polybutadiene, nitrile rubbers, styrene-butadiene copolymers, norborene such as 5-ethylidene-2-norbornene, and the like. The sealing composition may further comprise a catalyst for the hydrogenation or oxidation reaction. Suitable catalysts include complexes of Co or V, such as Co acetoacetate, Co acetylacetonate, V acetoacetate or V acetylacetonate. As in the microcup composition, the use of a gas absorber in the sealing layer improves the longevity of the display.

To improve the electron transfer reaction and in turn the display performance, the sealing composition preferably comprises a conductive filler such as particles or fibers of a conducting polymer, carbon black, graphite, metal or metal oxide as disclosed above for the primer layer. Suitable conducting polymers include polyacetylene, poly(p-phenylene), poly(p-phenylene vinylene), poly(phenylene sulfide), polypyrolle, polythiophene, polyaniline and doped derivatives thereof. Suitable metals include Au, Ag, Cu, Fe, Cr, Al, Mg, Zn or Ni. Suitable metal oxides include ITO, ATO or ZTO.

For anisotropic conductivity, the conductive material is preferably present in the sealing composition in the form of particles and the concentration of the conductive particles is so controlled that the vertical conductivity (conductivity in the electrode-electrolyte direction) is much higher than the horizontal conductivity (the conductivity in the direction parallel to the conductor film). Preferred concentrations of the conductive particles used in the sealing layer are from about 1-20% by volume, more preferably from about 5-15% by volume. The conducting polymer particles are the most preferred since they are more transparent and are of low specific gravity. The conducting polymers may be dispersed into the sealing fluid by attrition, grinding or precipitation under high shear.

IV. The ECD and EDD Electrolyt Fluids

The EDD Electrolytic Fluid

The electrolyte fluid of EDDs may be formed by dissolving a metal salt in a solution or in a polymer matrix to form a gel. A high boiling point solvent may be used as a plasticizer to improve the switching performance. Suitable metal salts include, but are not limited to, silver salts such as silver halides (e.g., silver bromide, silver iodide or silver chloride) and silver nitrate. Suitable polymer matrix includes poly(ethylene oxide), polyvinylpyrrolidone, hydroxyethyl cellulose, hydroxypropyl cellulose, methyl cellulose, gelatin, gum Arabic and their copolymers. Suitable non-aqueous solvents or plasticizers include dimethylsulfoxide (DMSO), dimethyl formamide (DMF), diethyl formamide (DEF), N,N-dimethylacetamide (DMAA), N-methylpropionic acid amide, N-methylpyrrolidone, propylene carbonate, acetonitrile, 2-methoxyethanol, 2-ethoxyethanol, dimethoxymethane (DME), glycerine carbonate, 2-methylglutaronitrile, γ-butyrolactone and the like. The metal salt may also be dissolved in a mixture of aqueous and non-aqueous solvents. The concentration of the metal salt may depend on the conductivity of the electrolyte fluid and usually ranges from about 0.03 to 2.0 mol/L, preferably from about 0.05 to 2.0 mol/L.

Furthermore, a supporting electrolyte such as lithium halide, sodium halide, potassium halide, calcium halide or a halogenated quaternary ammonium salt may be added to the electrolyte fluid to improve conductivity and promote dissolution of the silver salt. The supporting electrolyte is preferably present in the amount of about 0.5 to 5 times the silver salt.

Figure 6A:
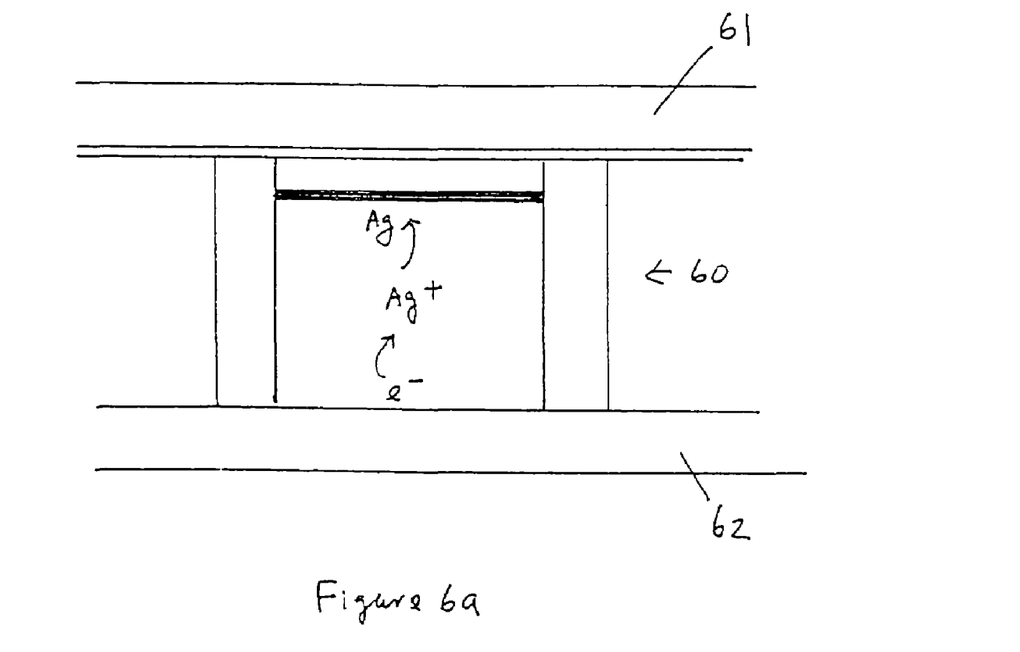
FIGS. 6a and 6b illustrate the operation of an electrodeposition display cell of the invention.
Figure 6B:
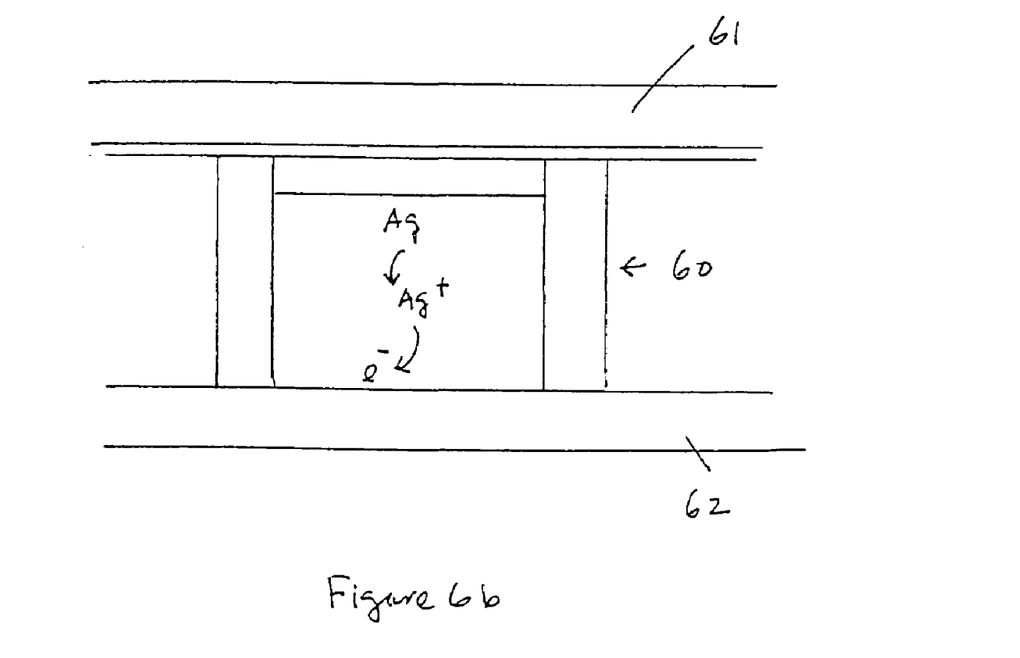

The operation of the electrodeposition device of the present invention is illustrated in FIGS. 6a and 6b. The cell (60) formed from the microcup technology is sandwiched between the top electrode plate (61) and the bottom elec- trode plate (62). The two electrode plates are connected to a driving power source (not shown). Depending on the driving voltage applied between the two electrode plates, the top electrode plate (61) may act as a cathode and the bottom electrode plate (62) as an anode, or vice versa. When the top electrode plate (61) acts as a cathode and the bottom electrode plate (62) as an anode, reduction of the metal ion takes place at the top electrode:

$$Ag^+ + e^- \rightarrow Ag$$

As a result, the silver particles formed are deposited in the region near the top electrode plate (FIG. 6a) causing the region to become a colored state, which can be observed by the viewer (assuming that the top side is the viewing side). The amount of the metal deposited may depend on the voltage applied. Therefore by varying the amount of voltage applied, the transmissivity of the display may vary. More specifically, the transmissivity may increase when the voltage applied decreases.

On the other hand, when the voltage applied is reversed, the bottom electrode plate (62) will act as a cathode and the top electrode plate (61) as an anode. Under this condition, oxidation of the silver particles takes place at the top electrode plate:

$$Ag \rightarrow Ag^+ + e^-$$

As a result, the top electrode plate is restored to the non-color state (FIG. 6b).

In order to increase the reflectance and contrast, reflecting particles may be added to the electrolyte fluid as the background color. The most preferred materials for the particles include $TiO_2$, $ZnO$, $BaSO_4$ and silica. The disadvantage of including the reflecting particles in the fluid is sedimentation of the particles. However this problem may be eliminated by microencapsulating the particles with suitable polymers to match the specific gravity of the particles to that of the electrolyte fluid. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

The ECD Electrolyte Fluid

An electrochromic fluid may comprise a redox chromophore such as bis (2-phosphonoethyl)-4,4'-bipyridinium dichloride or other viologens, an electrolyte such as 0.01-0.1 M of lithium perchlorate ($LiClO_4$), lithium triflate or tetrabutylammonium (TBA) triflate and an inert solvent, such as γ-butyrolactone, 3-methoxypropionitrile and the like. The fluid may also contain white pigment particles of rutile titania or zinc oxide to improve the reflectance and contrast ratio.

V. Preparation of ECDs or EDDs of the Invention

Figure 7:
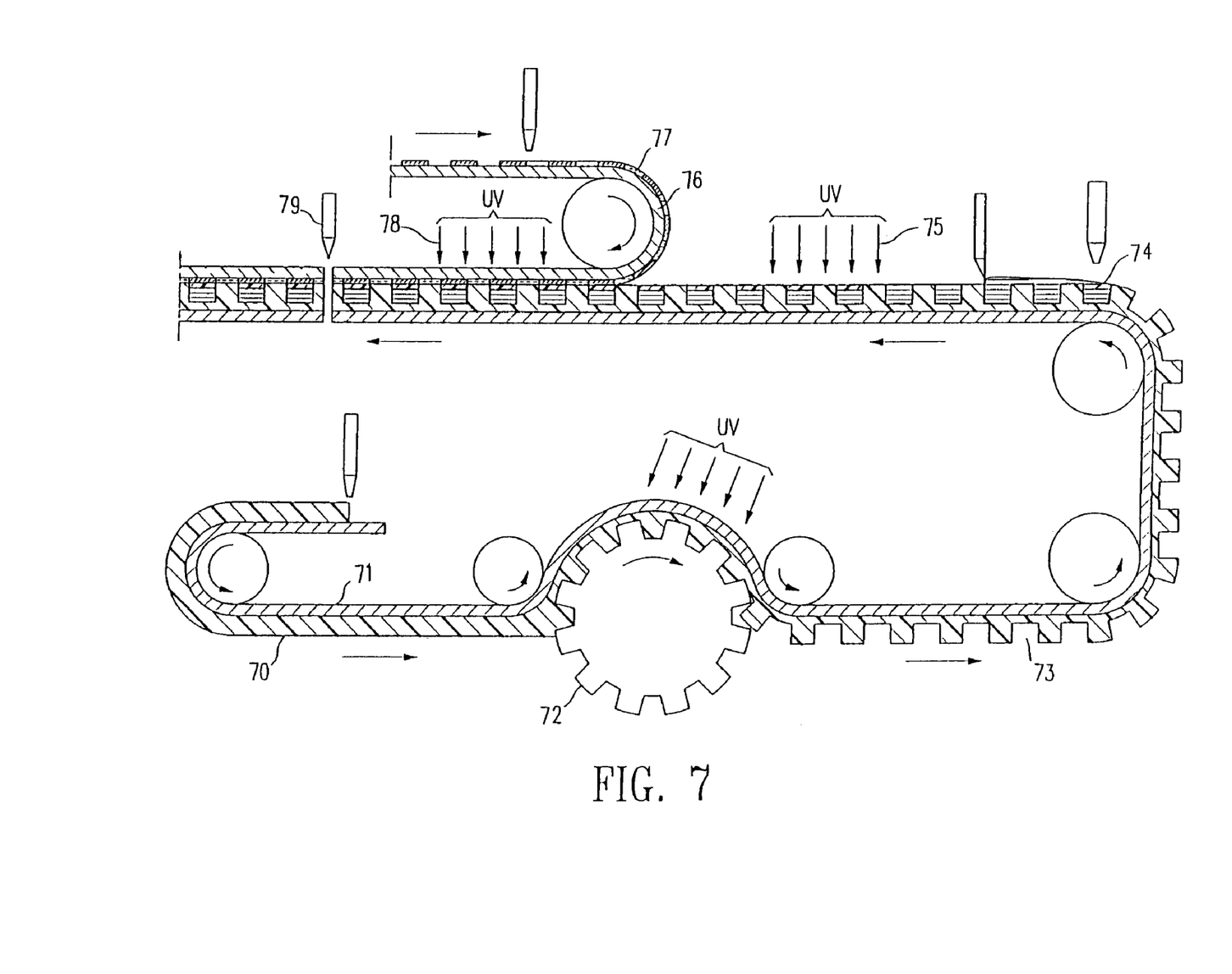
FIG. 7 is a flow chart for manufacturing an electrodeposition display.

The process is illustrated by the flow diagram as shown in FIG. 7. All microcups are filled with an electrolyte fluid. The process can be a continuous roll-to-roll process comprising the following steps:

1. Coat a layer of thermoplastic, thermoset or a precursor thereof (70) optionally with a solvent on a conductor film (71). The solvent, if present, readily evaporates.

2. Emboss the layer (70) at a temperature higher than the glass transition temperature of the material by a pre-patterned male mold (72).

3. Release the mold from the layer (70) preferably during or after it is hardened by proper means.

4. Fill in the thus-formed array of microcups (73) with an EDD or ECD electrolyte fluid containing a sealing composition, which is incompatible with the electrolyte fluid and has a lower specific gravity than the electrolyte fluid. The sealing composition comprises a conductive material, preferably conducting particles.

5. Seal the microcups by hardening the sealing composition preferably by radiation such as UV (75), or by heat or moisture during or after the sealing composition separates and forms a supernatant layer on top of the liquid phase thus forming closed display cells containing the electrolyte fluid.

6. Laminate the sealed array of display cells with a second conductor film (76) pre-coated with an adhesive layer (77) which may be a pressure sensitive adhesive, a hot melt adhesive or a heat, moisture or radiation curable adhesive. Preferred materials for the adhesive include acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers and their oligomers, polymers or copolymers. Preferably, the adhesive layer comprises dispersed conducting particles as described above for the primer and sealing layers to provide the anisotropic conductivity with the conductivity in the direction perpendicular to the electrode plate.

The adhesive layer may also comprise an unsaturated moiety or additive as a gas absorbing material. Suitable gas absorbers (in particular for chlorine, hydrogen or oxygen) include rubbers such as polybutadiene, nitrile rubbers, styrene-butadiene copolymers, norborene such as 5-ethylidene-2-norbornene, and the like. The adhesive layer may further comprise a catalyst for the hydrogenation or oxidation reaction. Suitable catalysts include complexes of Co or V, such as Co acetoacetate, Co acetylacetonate, V acetoacetate or V acetylacetonate.

The laminated adhesive may be post cured by radiation such as UV (78) through the top conductor film if the latter is transparent to the radiation. The finished product may be cut (79) after the lamination step.

The preparation of the microcups described above can be conveniently replaced by the alternative procedure of imagewise exposing a radiation curable composition pre-coated on the conductor film, followed by removing the unexposed areas by an appropriate solvent.

The conductor film may be pre-treated with a primer layer to improve the adhesion of the microcup to the conductor film and facilitate the release of the male mold from the microcup. The primer layer may be a conductive polymer or a polymeric coating filled with conducting materials.

In one of the preferred embodiments of the invention, the sealing of the microcups may alternatively be accomplished by first partially filling the microcup array with the electrolyte fluid, then overcoating and hardening the sealing composition over the surface of the fluid. This two-pass overcoating sealing process is particularly useful when the viscosity of the electrolyte fluid is too high for a fast phase separation in the above-mentioned one-pass sealing process or when the electrolyte fluid is at least partially compatible with the sealing composition.

The thickness of the display produced by the present processes as described can be as thin as a piece of paper. The width of the display is the width of the coating web (typically 3-90 inches). The length of the display can be anywhere from inches to thousands of feet depending on the size of the roll.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electroechromic or electrodeposition display comprising a plurality of cells, each of said cells comprises:
   (a) surrounding partition walls,
   (b) an electrochromic fluid or electrolytic fluid filled therein, and
   (c) a polymeric sealing layer which is formed from a sealing composition having a specific gravity lower than that of the electrochromic fluid or electrolytic fluid to enclose the electrochromic fluid or electrolytic fluid within each cell.

2. The display of claim 1 wherein said cell is partially filled.

3. The display of claim 2 wherein said polymeric sealing layer is in contact with said electrochromic fluid or electrolytic fluid filled in said cell.

4. The display of claim 1 wherein said electrolytic fluid comprises a metal salt dissolved in a solvent or in a polymer matrix.

5. The display of claim 4 wherein said metal salt is a silver salt.

6. The display of claim 5 wherein said silver salt is silver halide or silver nitrate.

7. The display of claim 4 wherein said polymer matrix is formed of a material selected from the group consisting of poly(ethylene oxide), polyvinylpyrrolidone, hydroxyethyl cellulose, hydroxypropyl cellulose, methyl cellulose, gelatin, gum Arabic and their copolymers.

8. The display of claim 4 wherein said solvent is a non-aqueous solvent.

9. The display of claim 8 wherein said non-aqueous solvent is selected from the group consisting of dimethylsulfoxide, dimethyl formamide, diethyl formamide, N, N-dimethylacetamide, N-methylpropionic acid amide, N-methylpyrrolidone, propylene carbonate, acetonitrile, 2-methoxyethanol, 2-ethoxyethanol, dimethoxymethane, glycerine carbonate, 2-methylglutaronitrile and γ-butyrolactone.

10. The display of claim 4 wherein said solvent is a mixture of aqueous and non-aqueous solvents.

11. The display of claim 4 wherein the concentration of said metal salt is from about 0.03 to about 2.0 mol/L.

12. The display of claim 11 wherein the concentration of said metal salt is from about 0.05 to about 2.0 mol/L.

13. The display of claim 4 wherein said electrolytic fluid further comprises a supporting electrolyte.

14. The display of claim 13 wherein said supporting electrolyte is lithium halide, sodium halide, potassium halide, calcium halide or a halogenated quaternary ammonium salt.

15. The display of claim 13 wherein the concentration of said supporting electrolyte is from about 0.5 to about 5 times said metal salt.

16. The display of claim 1 wherein each of said cells comprises said electrochromic fluid filled therein and said electrochromic fluid comprises a redox chromophore, an electrolyte and an inert solvent.

17. The display of claim 16 wherein said redox chromphore is a viologen derivative.

18. The display of claim 17 wherein said viologen is his (2-phosphonoethyl)-4,4'-bipyridinium dichloride.

19. The display of claim 16 wherein said electrolyte is lithium perchlorate, lithium triflate or tetrabutylammonium triflate.

20. The display of claim 16 wherein said inert solvent is γ-butyrolactone or 3-methoxypropionitrile.

21. The display of claim 16 wherein said electrochromic fluid further comprises white pigment particles of rutile titania, $BaSO_4$ or zinc oxide.

22. An electrochromic or electrodeposition display comprising
   a) a top electrode plate and a bottom electrode plate, at least one of which is transparent; and
   b) a plurality of cells enclosed between the two electrode plates, each of said cells comprising
      (i) surrounding partition walls,
      (ii) an electrochromic fluid or electrolytic fluid filled therein, and
      (iii) a polymeric sealing layer which is formed from a sealing composition having a specific gravity lower than that of the electrochromic fluid or electrolytic fluid to enclose the electrochromic fluid or electrolytic fluid within each cell.

23. The display of claim 22 wherein the thickness of the bottom of said cells is less than about 2 μm.

24. The display of claim 23 wherein the thickness of the bottom of said cells is less than about 1 μm.

25. The display of claim 22 wherein said cells are formed of a composition comprising a thermoplastic, thermoset or a precursor thereof.

26. The display of claim 25 wherein said composition further comprises a gas absorbing material.

27. The display of claim 26 wherein said gas absorbing material is a chlorine, hydrogen or oxygen absorbing material.

28. The display of claim 27 wherein said chlorine, hydrogen or oxygen absorbing material is selected from the group consisting of rubbers, nitrile rubbers, styrene-butadiene copolymers and norbornenes.

29. The display of claim 27 wherein said composition further comprises a catalyst for a hydrogenation or oxidation reaction.

30. The display of claim 29 wherein said catalyst is a complex of Co or V.

31. The display of claim 30 wherein said complex of Co or V is Co acetoacetate, Co acetylacetonate, V acetoacetate or V acetylacetonate.

32. The display of claim 22 wherein said sealing composition comprises a thermoplastic, a thermoset or a precursor thereof.

33. The display of claim 32 wherein said sealing composition further comprises a chlorine, hydrogen or oxygen absorbing material.

34. The display of claim 33 wherein said chlorine, hydrogen or oxygen absorbing material is selected from the group consisting of rubbers, nitrile rubbers, styrene-butadiene copolymers and norbornenes.

35. The display of claim 32 wherein said sealing composition further comprises particles or fibers of a conductive polymer or a doped derivative thereof, carbon black, graphite, a metal oxide or metal.

36. The display of claim 22 wherein said polymeric sealing layer has a vertical conductivity which is the conductivity in the direction perpendicular to the electrode plates and a horizontal conductivity which is the conductivity in the direction parallel to the electrode plates, and said vertical conductivity is higher than said horizontal conductivity.

37. The display of claim 35 wherein said particles have a concentration from about 1 to about 20% by volume.

38. The display of claim 37 wherein said particles have a concentration from about 5 to about 15% by volume.

39. The display of claim 1 wherein said sealing composition comprises a thermoplastic elastomer, a diene rubber, a polyurethane or a block copolymer thereof.

40. The display of claim 39 wherein said thermoplastic elastomer is a Kraton polymer.

41. The display of claim 39 wherein said diene rubber is polybutadiene, polychloroprene, polyisoprene or poly(styrene-co-butadiene).

42. The display of claim 39 wherein said sealing composition is in a solvent selected from the group consisting of methyl ethyl ketone, methyl propyl ketone, ethyl acetate, isopropyl acetate, butyl acetate, toluene, xylene, alkanes, cyclohexane, decalin, and dodecylbenzene.

43. The display of claim 22 wherein said top electrode plate is laminated over said polymeric sealing layer with an adhesive layer.

44. The display of claim 43 wherein said adhesive layer further comprises a gas absorbing material.

45. The display of claim 43 wherein said adhesive layer further comprises particles or fibers of a conductive polymer or a doped derivative thereof, carbon black, graphite, a metal oxide or metal.

46. The display of claim 43 wherein said adhesive layer has a vertical conductivity which is the conductivity in the direction perpendicular to the electrode plates and a horizontal conductivity which is the conductivity in the direction parallel to the electrode plates, and said vertical conductivity is higher than said horizontal conductivity.

47. The display of claim 22 further comprising a primer layer between the cells and said bottom electrode plate.

48. The display of claim 47 wherein said primer layer comprises particles or fibers of a conductive polymer or a doped derivative thereof, carbon black, graphite, a metal oxide or metal.

49. The display of claim 47 wherein said primer layer comprises a gas absorbing material.

50. The display of claim 1 wherein said electrochromic fluid or electrolytic fluid further comprises density-matched reflecting particles.

51. The display of claim 50 wherein said density-matched reflecting particles are formed of $TiO_2$, $ZnO$, $BaSO_4$ or silica.

52. The display of claim 43 wherein said gas absorbing material is a chlorine, hydrogen or oxygen absorbing material.

53. The display of claim 52 wherein said chlorine, hydrogen or oxygen absorbing material is selected from the group consisting of rubbers, nitrile rubbers, styrene-butadiene copolymers and norbornenes.

* * * * *